(12) United States Patent
Lee et al.

(10) Patent No.: US 10,876,338 B2
(45) Date of Patent: Dec. 29, 2020

(54) DOOR GLASS ASSEMBLY FOR VEHICLE

(71) Applicants: HYUNDAI MOTOR COMPANY, Seoul (KR); KIA MOTORS CORPORATION, Seoul (KR)

(72) Inventors: Hyeok Ji Lee, Jinju-si (KR); Seung Il Choi, Seoul (KR); Jin Ro Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 128 days.

(21) Appl. No.: 16/196,346

(22) Filed: Nov. 20, 2018

(65) Prior Publication Data
US 2020/0109585 A1 Apr. 9, 2020

(30) Foreign Application Priority Data

Oct. 8, 2018 (KR) .................. 10-2018-0120002

(51) Int. Cl.
*E05D 15/06* (2006.01)
*B60J 10/79* (2016.01)
*B60J 1/16* (2006.01)

(52) U.S. Cl.
CPC ............ *E05D 15/0621* (2013.01); *B60J 1/16* (2013.01); *B60J 10/79* (2016.02); *E05Y 2900/55* (2013.01)

(58) Field of Classification Search
CPC .... B60J 1/16; B60J 10/79; B60J 10/77; E05D 15/0621; E05Y 2900/55
See application file for complete search history.

(56) References Cited

U.S. PATENT DOCUMENTS

| | | | | | |
|---|---|---|---|---|---|
| 2,132,422 | A | * | 10/1938 | Kannel | B60J 1/14 454/134 |
| 4,158,270 | A | * | 6/1979 | Cherbourg | E05F 11/535 49/103 |
| 4,177,605 | A | * | 12/1979 | Cherbourg | E05F 11/535 49/136 |
| 8,769,872 | B2 | * | 7/2014 | Maltaverne | B60J 1/16 49/209 |
| 9,233,734 | B2 | * | 1/2016 | Erskine | E05F 1/16 |
| 2008/0060275 | A1 | * | 3/2008 | Recker | B60J 1/1853 49/408 |
| 2008/0100093 | A1 | * | 5/2008 | Seiple | B60J 1/2036 296/146.16 |
| 2009/0183434 | A1 | * | 7/2009 | Puotunen | B60J 1/14 49/209 |

(Continued)

*Primary Examiner* — Justin B Rephann
(74) *Attorney, Agent, or Firm* — Slater Matsil, LLP

(57) ABSTRACT

A door glass assembly for a vehicle, includes a door panel; a fixed wall which is fixedly connected to a top end of the door panel; an upper guide rail which is extended along a top edge of the fixed wall; a lower guide rail which is extended along a bottom edge of the fixed wall; and a door glass which is movable in a horizontal direction with respect to the fixed wall, and is guided to move along the upper guide rail and the lower guide rail in the horizontal direction, wherein the door glass opens and closes a portion of a door opening defined by the door panel and the fixed wall, and an external surface of the door glass is flush with an external surface of the fixed wall when the door glass is in a closed position to close the door opening.

19 Claims, 12 Drawing Sheets

(56) References Cited

U.S. PATENT DOCUMENTS

| | | | |
|---|---|---|---|
| 2009/0217595 A1* | 9/2009 | Grimm | B60J 1/16 49/413 |
| 2010/0071270 A1* | 3/2010 | Seiple | B60J 1/1853 49/413 |
| 2011/0006558 A1* | 1/2011 | Giret | B60J 1/16 296/146.15 |
| 2012/0167469 A1* | 7/2012 | Maltaverne | B60J 1/16 49/360 |

* cited by examiner

DOOR GLASS ASSEMBLY FOR VEHICLE

CROSS-REFERENCE TO RELATED APPLICATION

This application is based on and claims the benefit of priority to Korean Patent Application No. 10-2018-0120002, filed on Oct. 8, 2018, in the Korean Intellectual Property Office, the disclosure of which is incorporated herein in its entirety by reference.

TECHNICAL FIELD

The present disclosure relates to a door glass assembly for a vehicle.

BACKGROUND

Side doors of a passenger vehicle include a door frame having a window opening, a door glass which is movable in a vertical direction to open and close the window opening of the door frame, and a door regulator moving the door glass in the vertical direction.

In general, the side door of the vehicle has a stepped portion between an outer surface of the door frame and an outer surface of the door glass due to a roof of a vehicle body, a weatherstrip belt, a filler of the vehicle body, etc., so that the door glass is recessed relative to the door frame. The stepped portion may degrade the exterior styling of the vehicle, and may cause the generation of turbulence, wind noise, and the like while the vehicle is travelling, thereby degrading aerodynamic performance and noise vibration harshness (NVH) performance.

In addition, as a door panel of a typical side door has a sufficient space for receiving a door glass and a door regulator, the width of the door panel is increased, and thus the interior space of the vehicle is relatively narrowed.

The matters described in the background section are provided to assist in understanding the background of the invention, and may include any technical concept which is not considered as the prior art known to those skilled in the art.

SUMMARY

An aspect of the present disclosure provides a door glass assembly for a vehicle, allowing a flush-glass arrangement to minimize parts and guiding a door glass to move in a horizontal direction, thereby maximizing an interior space of the vehicle.

According to an aspect of the present disclosure, a door glass assembly for a vehicle, may include: a door panel; a fixed wall which is fixedly connected to a top end of the door panel; an upper guide rail which is extended along a top edge of the fixed wall; a lower guide rail which is extended along a bottom edge of the fixed wall; and a door glass which is movable in a horizontal direction with respect to the fixed wall, and is guided to move along the upper guide rail and the lower guide rail in the horizontal direction, wherein the door glass may open and close a portion of a door opening defined by the door panel and the fixed wall, and an external surface of the door glass may be flush with an external surface of the fixed wall when the door glass is in a closed position to close the door opening.

The upper guide rail may include a first upper rail section which is spaced apart from the fixed wall toward an interior space of the vehicle, a second upper rail section which is offset from the first upper rail section toward the interior space of the vehicle, and a third upper rail section connecting the first upper rail section and the second upper rail section, and the lower guide rail may include a first lower rail section which is spaced apart from the fixed wall toward the interior space of the vehicle, a second lower rail section which is offset from the first lower rail section toward the interior space of the vehicle, and a third lower rail section connecting the first lower rail section and the second lower rail section.

The door glass assembly may further include: a vertical guide rail attached to an internal surface of the door glass; and an upper guide shaft connected between the upper guide rail and the vertical guide rail, wherein the upper guide shaft may have a first roller which is guided along the upper guide rail, and a second roller which is guided along the vertical guide rail.

The door glass assembly may further include a lower guide shaft connected between the lower guide rail and an internal surface of a bottom end of the door glass, wherein the lower guide shaft may have a third roller which is guided along the lower guide rail.

The third upper rail section may be extended from a front end of the first upper rail section in an oblique direction, and the second upper rail section may be extended from a front end of the third upper rail section toward the front of the vehicle.

The third upper rail section and the second upper rail section may protrude from a front edge of the fixed wall toward the front of the vehicle.

The third lower rail section may be extended from a front end of the first lower rail section in an oblique direction, and the second lower rail section may be extended from a front end of the third lower rail section toward the front of the vehicle.

The third lower rail section and the second lower rail section may protrude from a front edge of the fixed wall toward the front of the vehicle.

The door glass assembly may further include: an upper support provided on a top end of the fixed wall, and supporting the upper guide rail; and a lower support provided on a bottom end of the fixed wall, and supporting the lower guide rail.

The upper support may include a first upper support section supporting the first upper rail section, a second upper support section supporting the second upper rail section, and a third upper support section supporting the third upper rail section.

The door glass assembly may further include: an upper flat section connected to a top end of the upper support; and at least one weatherstrip disposed between the upper flat section and a top edge of the door glass, wherein the weatherstrip may seal the top edge of the door glass.

The lower support may include a first lower support section supporting the first lower rail section, a second lower support section supporting the second lower rail section, and a third lower support section supporting the third lower rail section.

The door glass assembly may further include: a lower flat section connected to a bottom end of the lower support; and at least one weatherstrip disposed between the lower flat section and a bottom edge of the door glass, wherein the weatherstrip may seal the bottom edge of the door glass.

An interior trim may be fixedly connected to an internal surface of a front edge of the fixed wall, and the interior trim may have at least one weatherstrip sealing a rear edge of the door glass.

BRIEF DESCRIPTION OF THE DRAWINGS

The above and other aspects, features and advantages of the present disclosure will be more apparent from the following detailed description taken in conjunction with the accompanying drawings.

DETAILED DESCRIPTION

Figure 1:
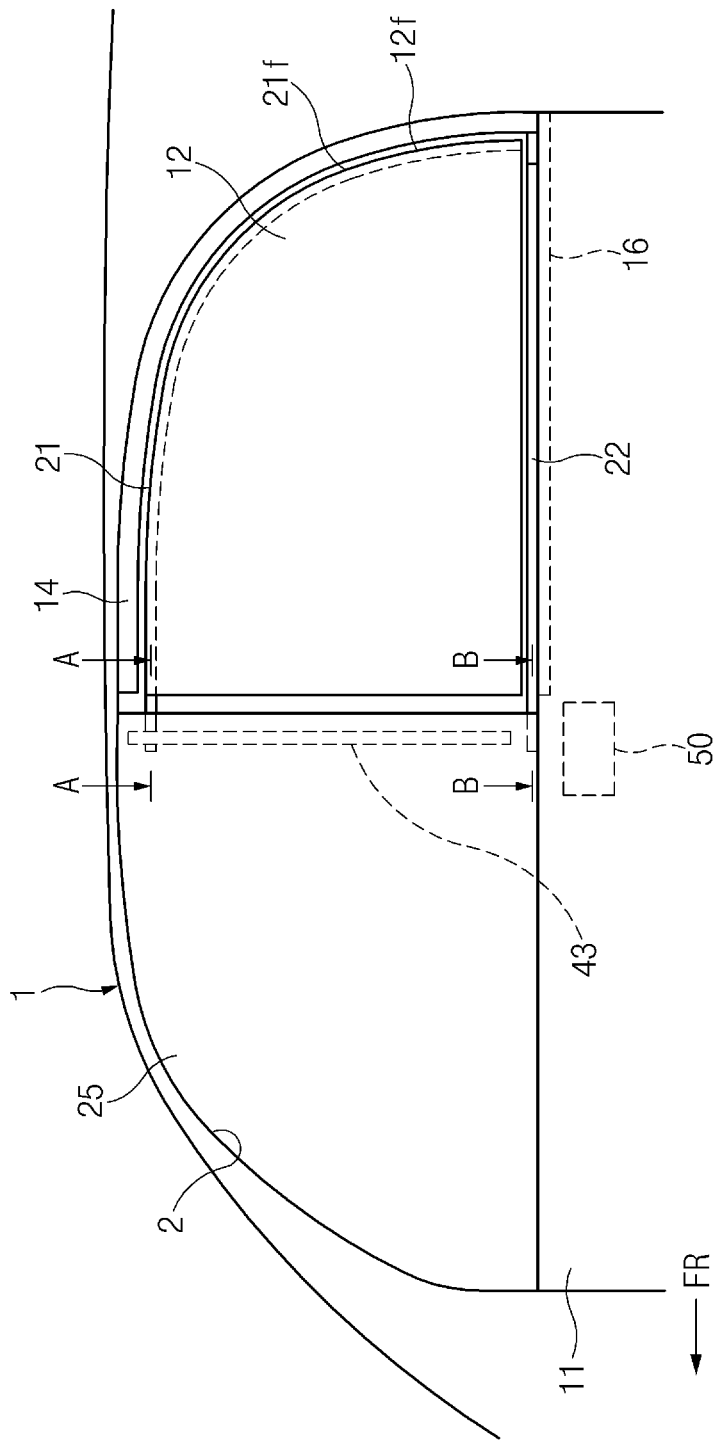
FIG. 1 illustrates a side view of a vehicle having a door glass assembly for a vehicle according to an embodiment of the present disclosure, in a state in which the door glass assembly closes a door opening of the vehicle.

Hereinafter, embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

In a flush-glass arrangement, the door glass is flush with the door frame or the outer surface of the vehicle. In the flush-glass arrangement, however, it is required to maintain a gap between the door frame and the door glass uniformly and to secure the vertical movement of the door glass, so that the door frame structure may become complicated. Thus, expensive parts may be additionally required, and the assembly process may be difficult, resulting in an increase in manufacturing costs.

Figure 2:
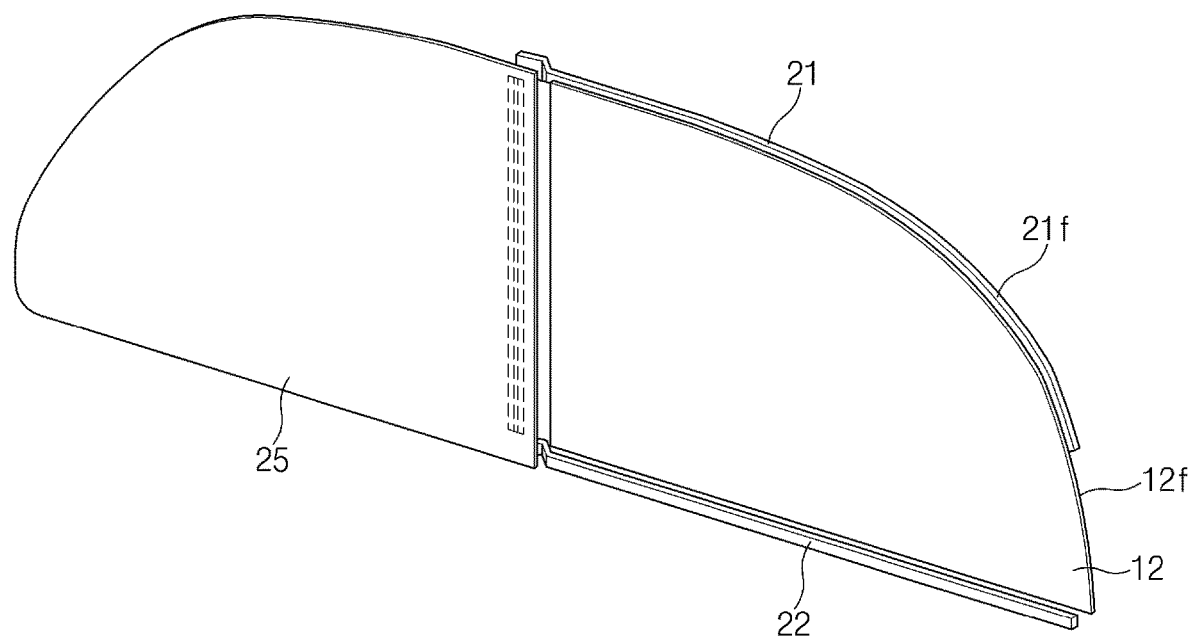
FIG. 2 illustrates a perspective view of a door glass assembly for a vehicle according to an embodiment of the present disclosure.

Referring to FIGS. 1 and 2, a door glass assembly 10 for a vehicle, according to an embodiment of the present disclosure, may include a door panel 11, a fixed wall 12 which is fixedly connected to a top end of the door panel 11, and a door glass 25 which is movable in a horizontal direction with respect to the fixed wall 12.

Figure 7:
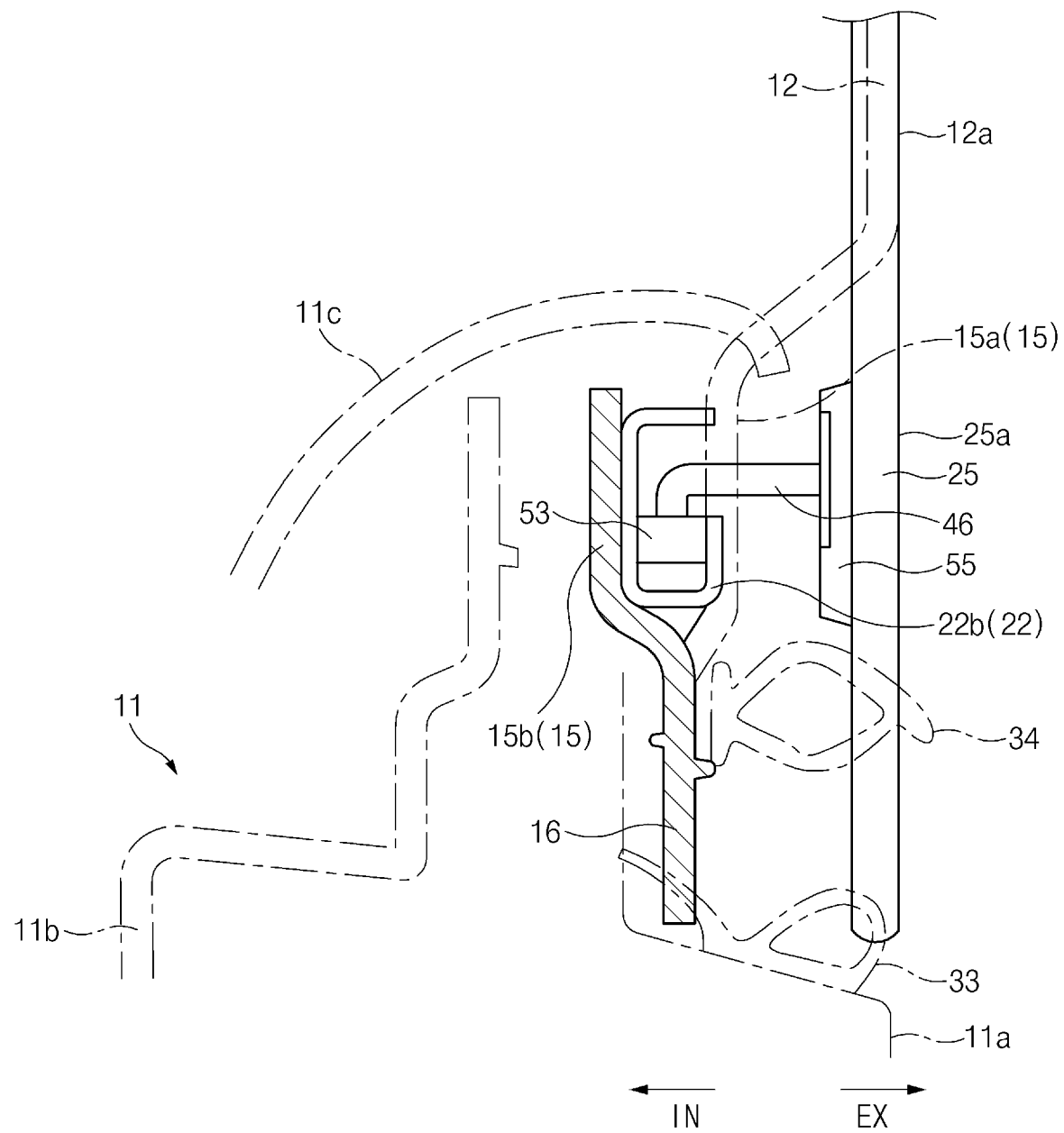
FIG. 7 illustrates a cross-sectional view taken along line E-E of FIG. 6.

As illustrated in FIG. 7, the door panel 11 may have an outer panel 11a, an inner panel 11b, and a door trim 11c.

Figure 8:
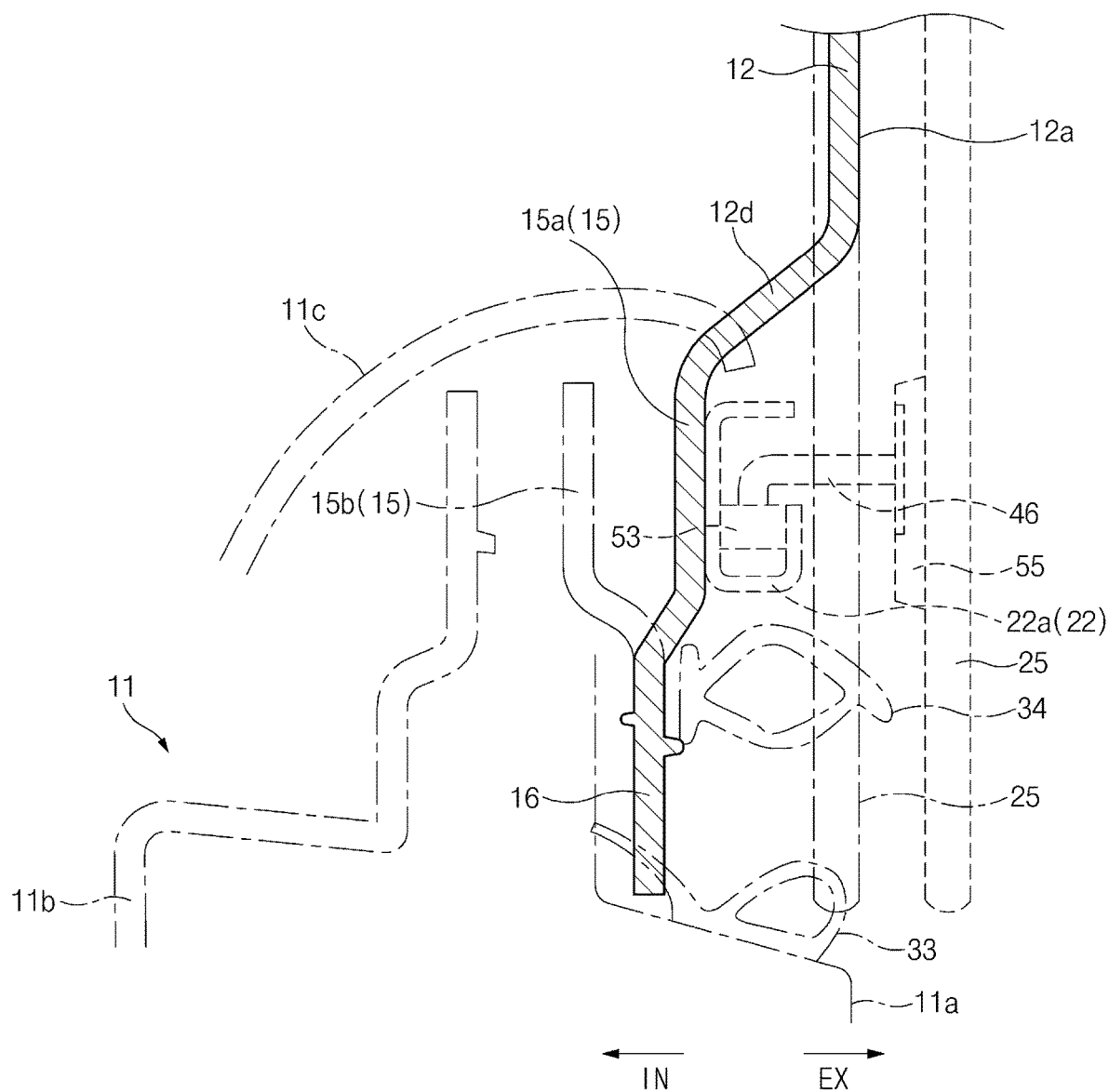
FIG. 8 illustrates a cross-sectional view taken along line F-F of FIG. 6.

As illustrated in FIGS. 7 and 8, a bottom end of the fixed wall 12 may be fixedly connected to the outer panel 11a of the door panel 11.

Figure 9:
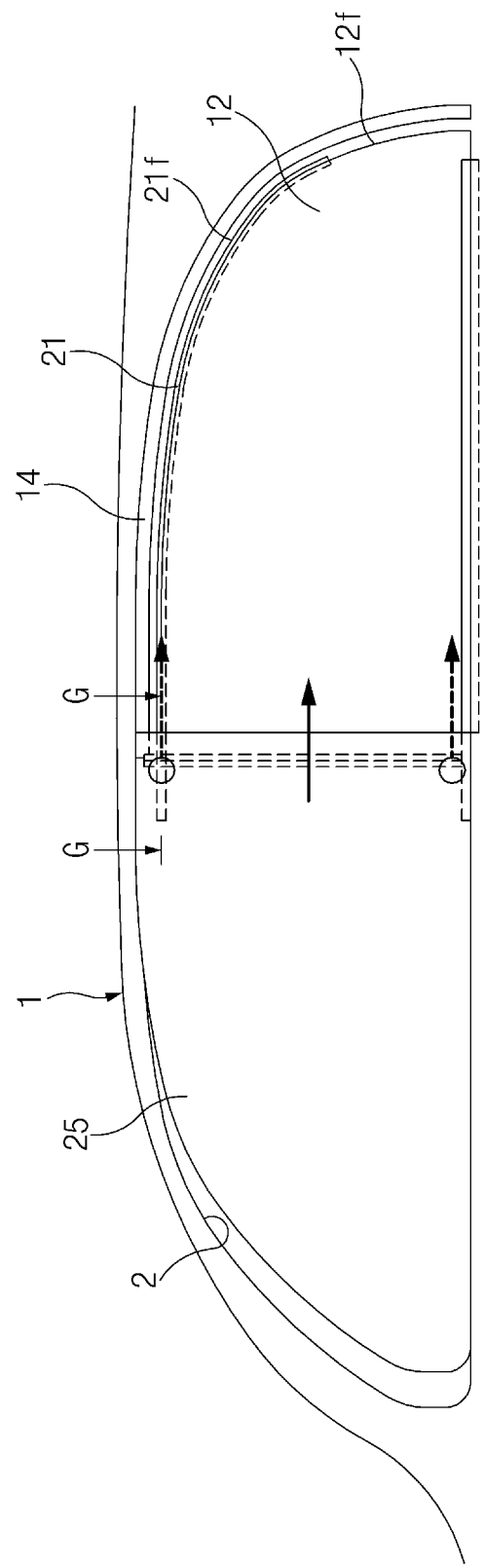
FIG. 9 illustrates a side view of a vehicle having a door glass assembly for a vehicle according to an embodiment of the present disclosure, in a state in which a door glass starts to open a portion of a door opening.
Figure 11:
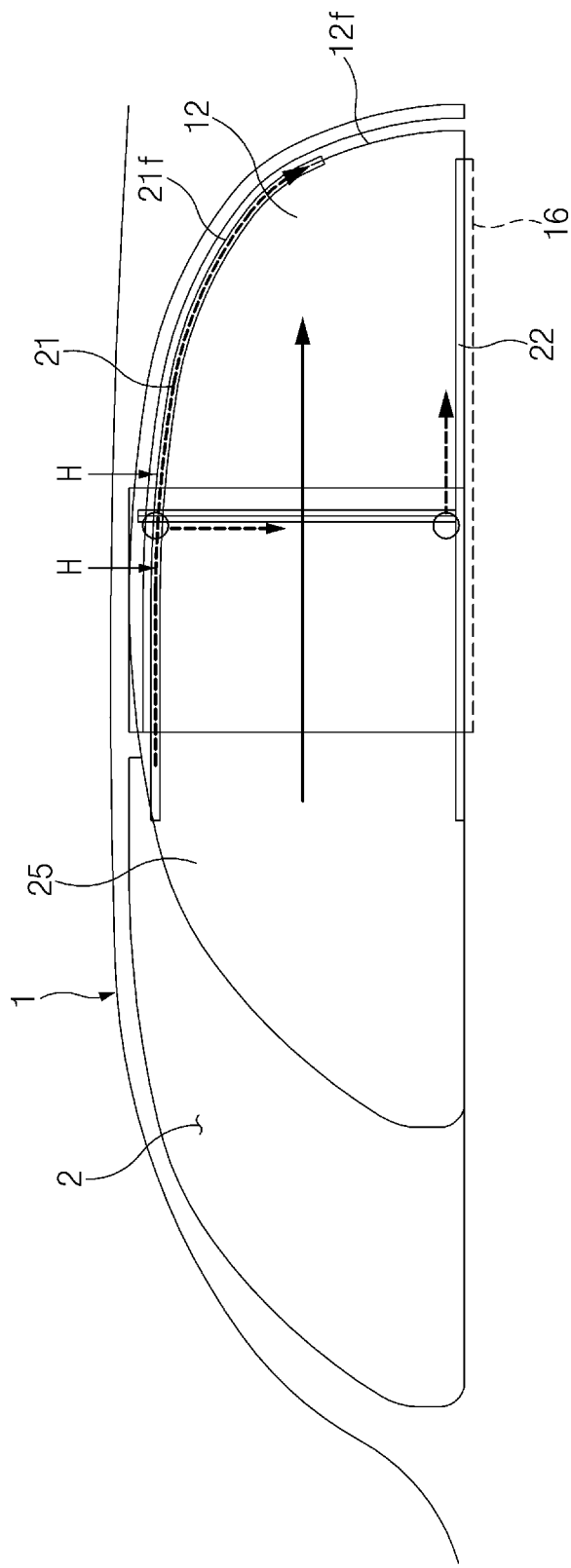
FIG. 11 illustrates a side view of a vehicle having a door glass assembly for a vehicle according to an embodiment of the present disclosure, in a state in which a door glass is moved to a fully opened position to fully open a portion of a door opening.

Referring to FIG. 1, in embodiments, the door glass assembly 10 may open and close a door opening 2 of a vehicle 1. As illustrated in FIGS. 1, 9, and 11, a portion of the door opening 2 may be opened and closed by the door glass 25. The portion of the door opening 2 to be opened and closed by the door glass 25 may be defined by the door panel 11 and the fixed wall 12. As illustrated in FIGS. 1, 9, and 11, the portion of the door opening 2 may be defined by a top edge of the door panel 11 and a front edge of the fixed wall 12. In embodiments, the opening may be defined by the top edge of the door panel, a front edge of the fixed wall 12 and a portion of a vehicle body.

The door glass 25 may be movable between an opened position in which the portion of the door opening 2 is opened (see FIG. 11) and a closed position in which the portion of the door opening 2 is closed (see FIG. 1). The door glass 25 may be mechanically connected to a drive mechanism 50, and the door glass 25 may be moved horizontally by the drive mechanism 50 to open and close the portion of the door opening 2. Similar to a drive mechanism for a sunroof, the drive mechanism 50 may have a drive motor and a power transmission mechanism to move the door glass 25 in the horizontal direction. The drive mechanism 50 may be disposed inside the door panel 11 adjacent to the bottom end of the fixed wall 12, and thus the door panel 11 may be made thinner than a typical one.

In the illustrated embodiment, in a state in which the door glass assembly 10 fully closes the door opening 2 of the vehicle, the fixed wall 12 may partition an interior space and an exterior space of the vehicle.

As illustrated in FIGS. 1 and 2, an upper guide rail 21 may be fixedly connected to or coupled to a top end of the fixed wall 12, and the upper guide rail 21 may extend along a top edge of the fixed wall 12. A lower guide rail 22 may be fixedly connected to the bottom end of the fixed wall 12, and the lower guide rail 22 may extend along a bottom edge of the fixed wall 12. The upper guide rail 21 and the lower guide rail 22 may guide the horizontal movement of the door glass 25.

As illustrated in FIGS. 1 and 2, in embodiments, the top edge of the fixed wall 12 may have a curved section 12f on the rear thereof, and the upper guide rail 21 may have a curved section 21f corresponding to the curved section 12f of the fixed wall 12.

Figure 3:
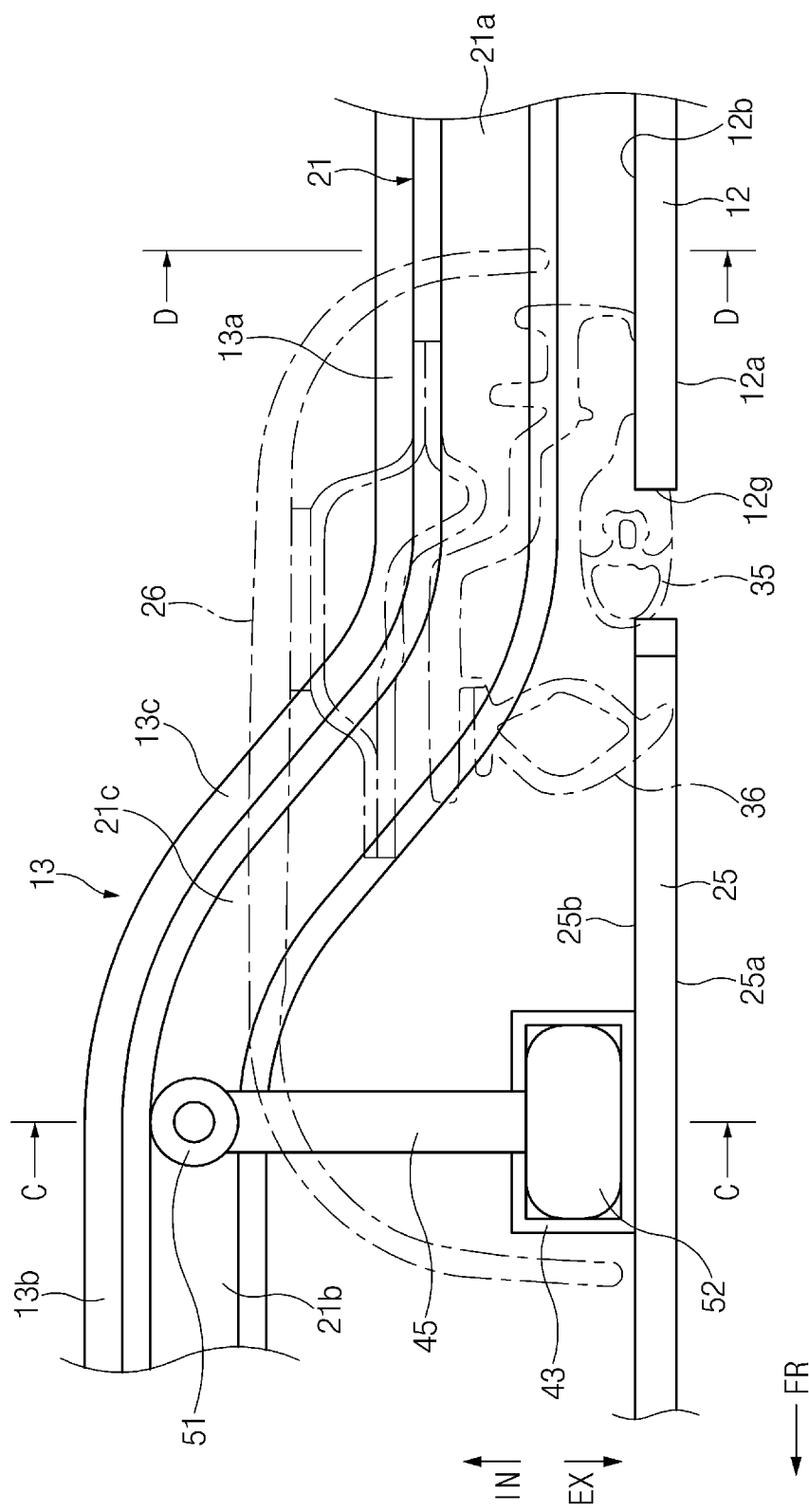
FIG. 3 illustrates a cross-sectional view taken along line A-A of FIG. 1.
Figure 4:
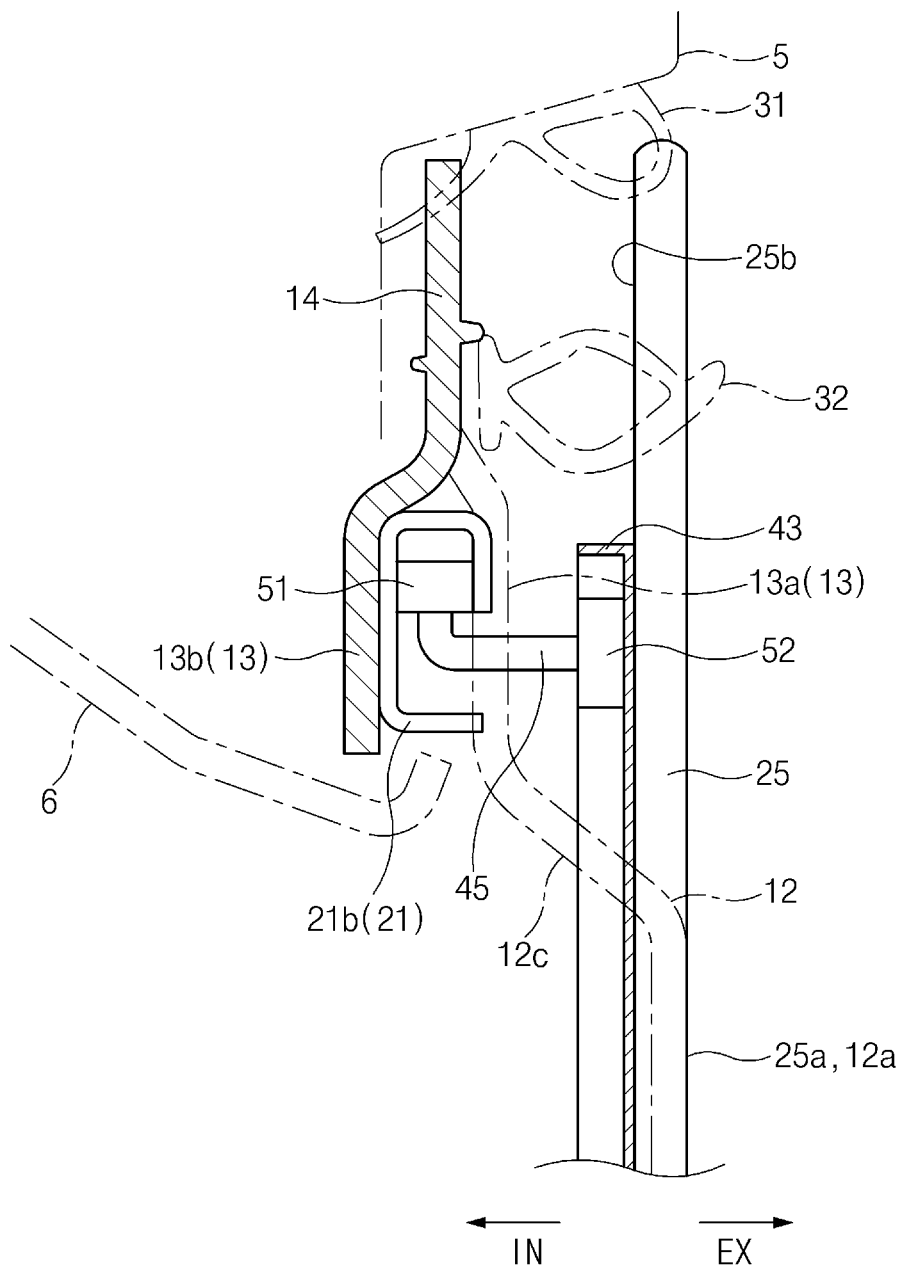
FIG. 4 illustrates a cross-sectional view taken along line C-C of FIG. 3.
Figure 5:
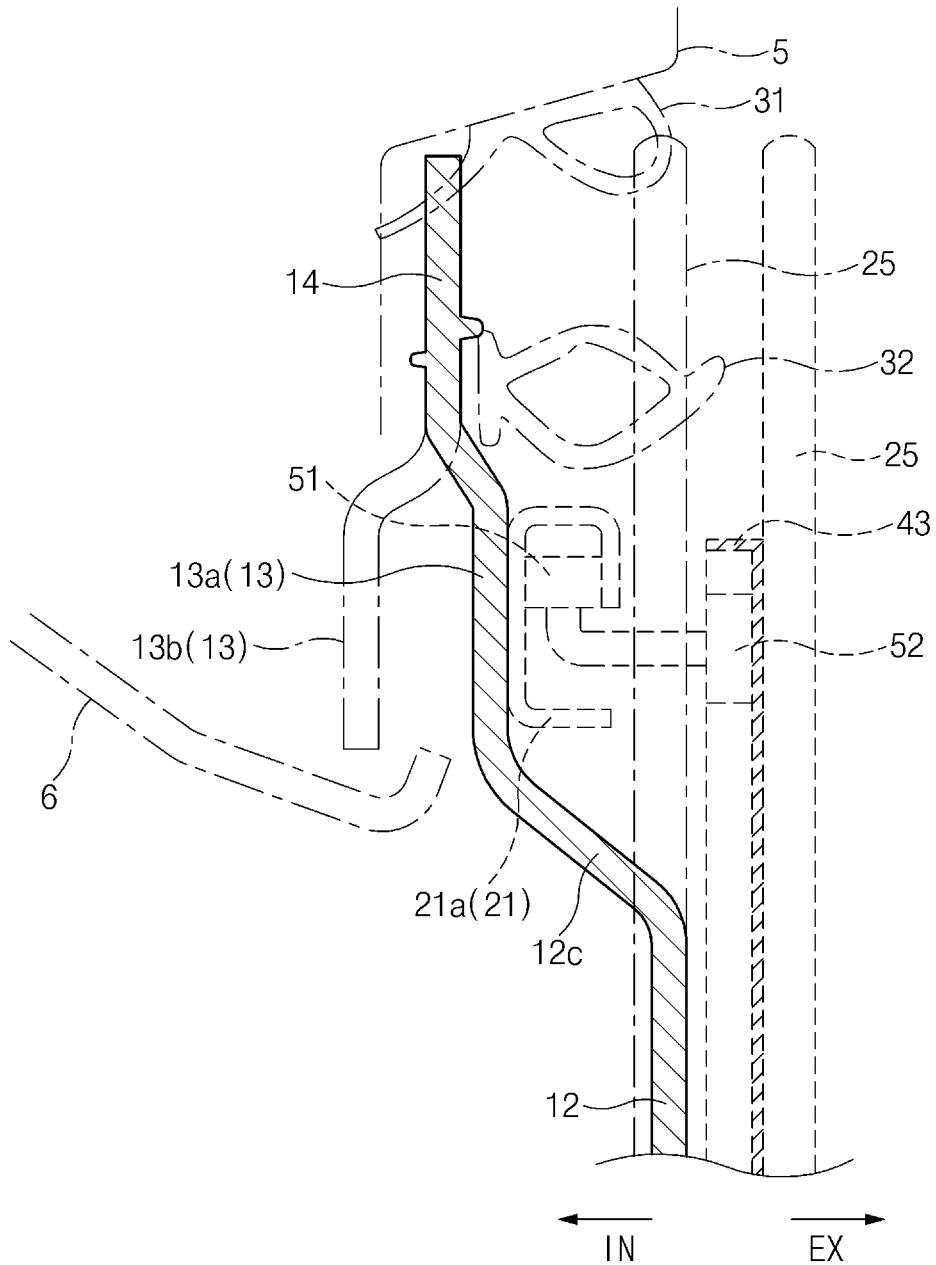
FIG. 5 illustrates a cross-sectional view taken along line D-D of FIG. 3.

Referring to FIGS. 3 to 5, in embodiments, an upper support 13 may be provided on the top end of the fixed wall 12, and the upper support 13 may support the upper guide rail 21. For example, the upper guide rail 21 may be connected to the upper support 13 by welding, fasteners, or the like, so that the upper guide rail 21 may be supported by the upper support 13. The upper support 13 and the upper guide rail 21 may be spaced apart from an internal surface 12b of the fixed wall 12 toward the interior space of the vehicle (see the direction of arrow IN).

Referring to FIG. 3, the upper guide rail 21 may include a first upper rail section 21a, a second upper rail section 21b and a third upper rail section 21c. The first upper rail section 21a is spaced apart from the fixed wall 12 toward the interior space of the vehicle. The second upper rail section 21b is offset from the first upper rail section 21a toward the interior space of the vehicle. The third upper rail section 21c connecting the first upper rail section 21a and the second upper rail section 21b. The first upper rail section 21a may extend along the top edge of the fixed wall 12, and the second upper rail section 21b may be connected to the first upper rail section 21a through the third upper rail section 21c. The third upper rail section 21c may extend between the first upper rail section 21a and the second upper rail section 21b in an oblique direction. In embodiments, the first upper rail section 21a is parallel to the second upper rail section 21b, and the third upper rail section 21c is inclined with respect to the first and second upper rail sections.

As illustrated in FIG. 3, the third upper rail section 21c may extend from a front end of the first upper rail section 21a in the oblique direction, and the second upper rail section 21b may extend from a front end of the third upper rail section 21c toward the front of the vehicle. In embodiments, the third upper rail section 21c and the second upper rail section 21b may protrude from a front end 12g of the fixed wall 12 toward the front of the vehicle (see the direction of arrow FR in FIG. 3). As illustrated in FIG. 3, when the door glass 25 is in the closed position to close the door opening 2, a front edge of the first upper rail section 21a may be adjacent to a rear edge of the door glass 25, and an external surface 25a of the door glass 25 may be flush with an external surface 12a of the fixed wall 12. As described above, the second upper rail section 21b may be offset from the fixed wall 12 toward the interior space of the vehicle, and protrude from the front end 12g of the fixed wall 12 toward the front of the vehicle, so that a simple, compact flush-glass arrangement may be effectively achieved.

Referring to FIG. 3, in embodiments, the upper support 13 may include a first upper support section 13a supporting the first upper rail section 21a, a second upper support section 13b supporting the second upper rail section 21b, and a third upper support section 13c supporting the third upper rail section 21c. The first upper support section 13a may extend along the top edge of the fixed wall 12, and the second upper support section 13b may be connected to the first upper support section 13a through the third upper support section 13c. The third upper support section 13c may extend between the first upper support section 13a and the second upper support section 13b in the oblique direction.

As illustrated in FIGS. 3 and 5, in embodiments, the first upper rail section 21a may be connected to the first upper support section 13a by welding, fasteners, or the like.

As illustrated in FIGS. 3 and 4, the second upper rail section 21b may be connected to the second upper support section 13b by welding, fasteners, or the like. As illustrated in FIG. 5, the second upper support section 13b may be integrally connected to the top end of the fixed wall 12 through an inclined portion 12c.

Referring to FIGS. 1, 4, and 5, in embodiments, an upper flat section 14 may be connected or coupled to a top end of the upper support 13, and the upper flat section 14 may extend along the top edge of the fixed wall 12. Thus, the upper flat section 14 may be integrally connected to the top end of the first upper support section 13a, the top end of the second upper support section 13b, and the top end of the third upper support section 13c.

Referring to FIGS. 4 and 5, the upper flat section 14 may be adjacent to an interior headliner 6 and a roof side outer 5 of the vehicle. As illustrated in FIGS. 4 and 5, a first weatherstrip 31 and a second weatherstrip 32 may be disposed between the upper flat section 14 and a top edge of the door glass 25. The first weatherstrip 31 may be mounted on the roof side outer 5 of the vehicle, and the second weatherstrip 32 may be mounted on the upper flat section 14. The first and second weatherstrips 31 and 32 may seal the top edge of the door glass 25.

As illustrated in FIG. 3, the third upper rail section 21c may be connected to the third upper support section 13c by welding, fasteners, or the like.

Referring to FIG. 3, in embodiments, the door glass 25 may have the external surface 25a facing the exterior space of the vehicle (see the direction of arrow EX) and an internal surface 25b facing the interior space of the vehicle (see the direction of arrow IN). A vertical guide rail 43 which vertically extends may be attached to the internal surface 25b of the door glass 25. A top end of the door glass 25 may move along the upper guide rail 21 and the vertical guide rail 43, and an upper guide shaft 45 may be connected between the upper guide rail 21 and the vertical guide rail 43.

In the illustrated embodiment, a first roller 51 may be rotatably mounted on one end of the upper guide shaft 45, and an axis of rotation of the first roller 51 may be orthogonal to an axis of the upper guide shaft 45. The first roller 51 may roll along the upper guide rail 21. A second roller 52 may be rotatably mounted on the other end of the upper guide shaft 45, and an axis of rotation of the second roller 52 may be coincident with or parallel to the axis of the upper guide shaft 45. The second roller 52 may roll and move along the vertical guide rail 43. When the first roller 51 of the upper guide shaft 45 moves along the curved section 21f of the upper guide rail 21, the second roller 52 of the upper guide shaft 45 may move along the vertical guide rail 43 so that the door glass 25 may be moved in the horizontal direction. The upper guide shaft 45 may move along the upper guide rail 21 in the horizontal direction while moving along the vertical guide rail 43 in the vertical direction, so that the door glass 25 may be stably moved in the horizontal direction regardless of the curvature of the curved section 21f of the upper guide rail 21.

Figure 6:
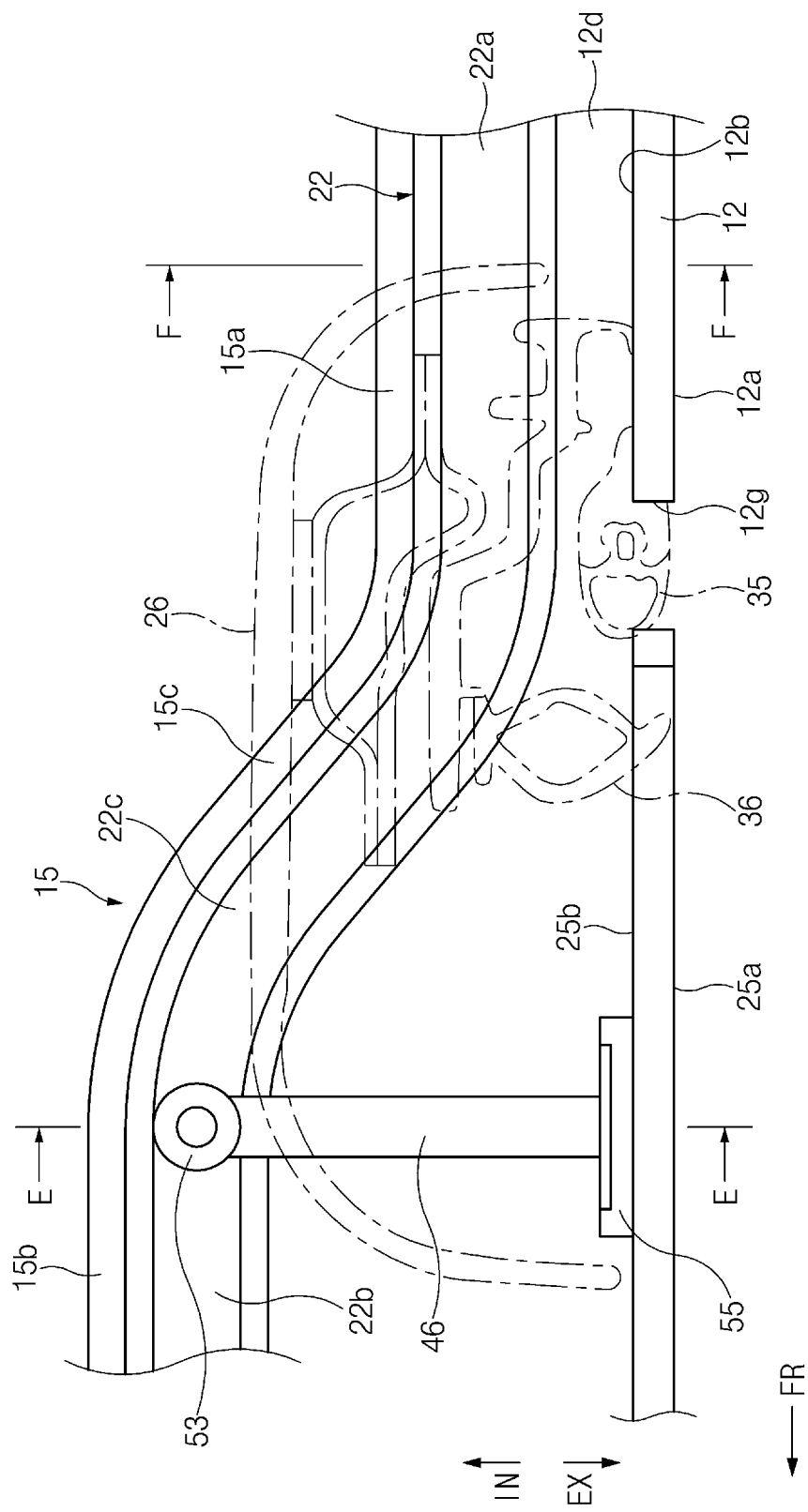
FIG. 6 illustrates a cross-sectional view taken along line B-B of FIG. 1.

Referring to FIGS. 6 to 8, in embodiments, a lower support 15 may be provided at the bottom end of the fixed wall 12, and the lower support 15 may support the lower guide rail 22. For example, the lower guide rail 22 may be connected to the lower support 15 by welding, fasteners, or the like, so that the lower guide rail 22 may be supported by the lower support 15.

Referring to FIG. 6, the lower guide rail 22 may include a first lower rail section 22a which is spaced apart from the fixed wall 12 toward the interior space of the vehicle, a second lower rail section 22b which is offset from the first lower rail section 22a toward the interior space of the vehicle, and a third lower rail section 22c connecting the first lower rail section 22a and the second lower rail section 22b. The first lower rail section 22a may extend along a longitudinal direction of the fixed wall 12, and the second lower rail section 22b may be connected to the first lower rail section 22a through the third lower rail section 22c. The third lower rail section 22c may extends between the first lower rail section 22a and the second lower rail section 22b in an oblique direction. In embodiments, the first lower rail section 22a is parallel to the second lower rail section 22b, and the third lower rail section 22c is inclined with respect to the first and second lower rail sections.

Referring to FIG. 6, the lower support 15 may include a first lower support section 15a supporting the first lower rail section 22a, a second lower support section 15b supporting the second lower rail section 22b, and a third lower support section 15c supporting the third lower rail section 22c. The first lower support section 15a may extends along the bottom edge of the fixed wall 12, and the second lower support section 15b may be connected to the first lower support section 15a through the third lower support section 15c. The third lower support section 15c may extends between the first lower support section 15a and the second lower support section 15b in the oblique direction.

As illustrated in FIG. 6, the first lower rail section 22a may extends along the top edge of the fixed wall 12, the third lower rail section 22c may extends from a front end of the first lower rail section 22a in the oblique direction, and the second lower rail section 22b may extends from a front end of the third lower rail section 22c. In embodiments, the third lower rail section 22c and the second lower rail section 22b may protrude from the front end 12g of the fixed wall 12 toward the front of the vehicle (see the direction of arrow FR in FIG. 6). As illustrated in FIG. 6, when the door glass 25 is in the closed position to close the door opening 2 of the vehicle 1 is closed, a front edge of the first lower rail section 22a may be adjacent to the rear edge of the door glass 25, and the external surface 25a of the door glass 25 may be flush with the external surface 12a of the fixed wall 12. As described above, the second lower rail section 22b may be offset from the fixed wall 12 toward the interior space of the vehicle, and protrude from the front end 12g of the fixed wall 12 toward the front of the vehicle, so that a simple, compact flush-glass arrangement may be effectively achieved.

As illustrated in FIGS. 6 and 8, the first lower rail section 22a may be connected to the first lower support section 15a by welding, fasteners, or the like.

As illustrated in FIGS. 6 and 7, the second lower rail section 22b may be connected to the second lower support section 15b by welding, fasteners, or the like. As illustrated in FIG. 8, the second lower support section 15b may be integrally connected to the bottom end of the fixed wall 12 through an inclined portion 12d.

Referring to FIGS. 1, 7, and 8, a lower flat section 16 may be connected to a bottom end of the lower support 15, and the lower flat section 16 may extend along the bottom edge of the fixed wall 12. Thus, the lower flat section 16 may be integrally connected to the bottom end of the first lower support section 15a, the bottom end of the second lower support section 15b, and the bottom end of the third lower support section 15c.

As illustrated in FIGS. 7 and 8, in embodiments, the lower flat section 16 may be adjacent to the outer panel 11a and the door trim 11c of the door panel 11. A third weatherstrip 33 and a fourth weatherstrip 34 may be disposed between the lower flat section 16 and a bottom edge of the door glass 25. The third weatherstrip 33 may be mounted on the outer panel 11a of the door panel 11, and the fourth weatherstrip 34 may be mounted on the lower flat section 16. The third and fourth weatherstrips 33 and may seal the bottom edge of the door glass 25. In one embodiment, the fixed wall 12, the upper and lower supports 13 and 15 and the upper and lower flat sections 14 and 16 may be formed of a single piece metal plate.

As illustrated in FIG. 6, the third lower rail section 22c may be connected to the third lower support section 15c by welding, fasteners, or the like.

Referring to FIG. 6, in embodiments, a bottom end of the door glass 25 may move along the lower guide rail 22, and a lower guide shaft 46 may be connected between the lower guide rail 22 and the internal surface 25b of the bottom end of the door glass 25. A third roller 53 may be rotatably mounted on one end of the lower guide shaft 46, and an axis of rotation of the third roller 53 may be orthogonal to an axis of the lower guide shaft 46. The third roller 53 may roll along the lower guide rail 22. A fixed bracket 55 may be provided at the other end of the lower guide shaft 46, and the fixed bracket 55 may be attached to the internal surface 25b of the bottom end of the door glass 25, so that the other end of the lower guide shaft 46 may be fixedly connected to the internal surface 25b of the bottom end of the door glass 25 through the fixed bracket 55. As the third roller 53 of the lower guide shaft 46 rolls along the lower guide rail 22, the bottom end of the door glass 25 may move along the lower guide rail 22 in the horizontal direction.

As illustrated in FIGS. 1, 3, and 6, when the door glass 25 is in the closed position, the rear edge of the door glass 25 may face the first upper rail section 21a, and the external surface 25a of the door glass 25 may be flush with the external surface 12a of the fixed wall 12. In the illustrated embodiment, there is no stepped portion between the door glass 25 and the fixed wall 12.

As illustrated in FIGS. 3 and 6, an interior trim 26 may be fixedly connected to the internal surface of the front edge of the fixed wall 12. The interior trim 26 may have a fifth weatherstrip 35 and a sixth weatherstrip 36 sealing the rear edge of the door glass 25. When the door glass 25 is in the closed position, the rear edge of the door glass 25 may be adjacent to the front edge of the fixed wall 12, and the interior trim 26 may be disposed between the rear edge of the door glass 25 and the front edge of the fixed wall 12.

When the door glass 25 fully closes the door opening 2 as illustrated in FIG. 1, the first roller 51 of the upper guide shaft 45 may be positioned on the second upper rail section 21b of the upper guide rail 21 as illustrated in FIG. 3, and the third roller 53 of the lower guide shaft 46 may be positioned on the second lower rail section 22b of the lower guide rail 22 as illustrated in FIG. 6.

Figure 10:
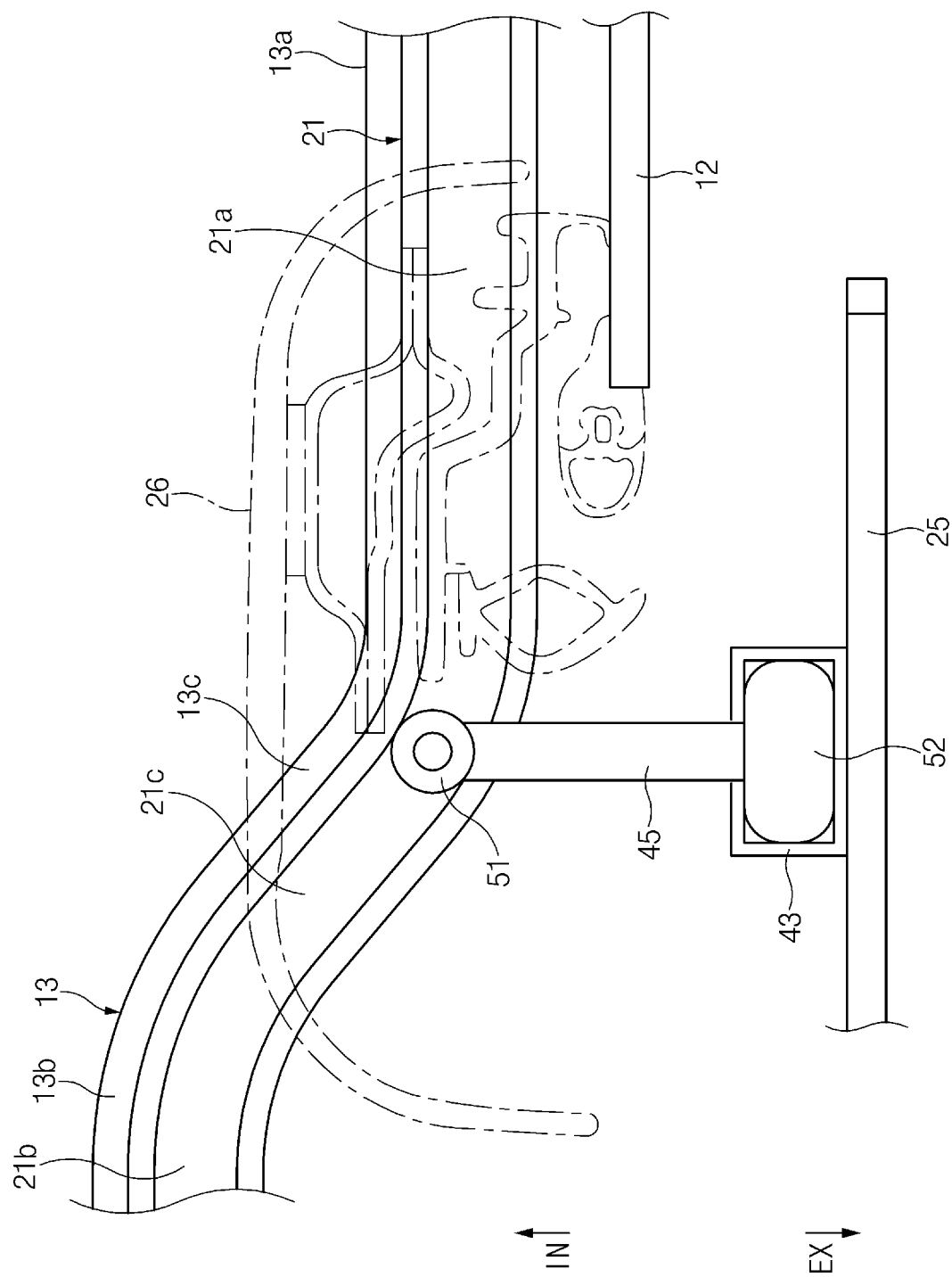
FIG. 10 illustrates a cross-sectional view taken along line G-G of FIG. 9.

In embodiments, when the door glass 25 starts moving to the opened position by the drive mechanism 50 to open a portion of the door opening 2 as illustrated in FIG. 9, the first roller 51 of the upper guide shaft 45 may be guided along the third upper rail section 21c of the upper guide rail 21 as illustrated in FIG. 10, and the door glass 25 may protrude toward the exterior space of the vehicle (see the direction of arrow EX).

Figure 12:
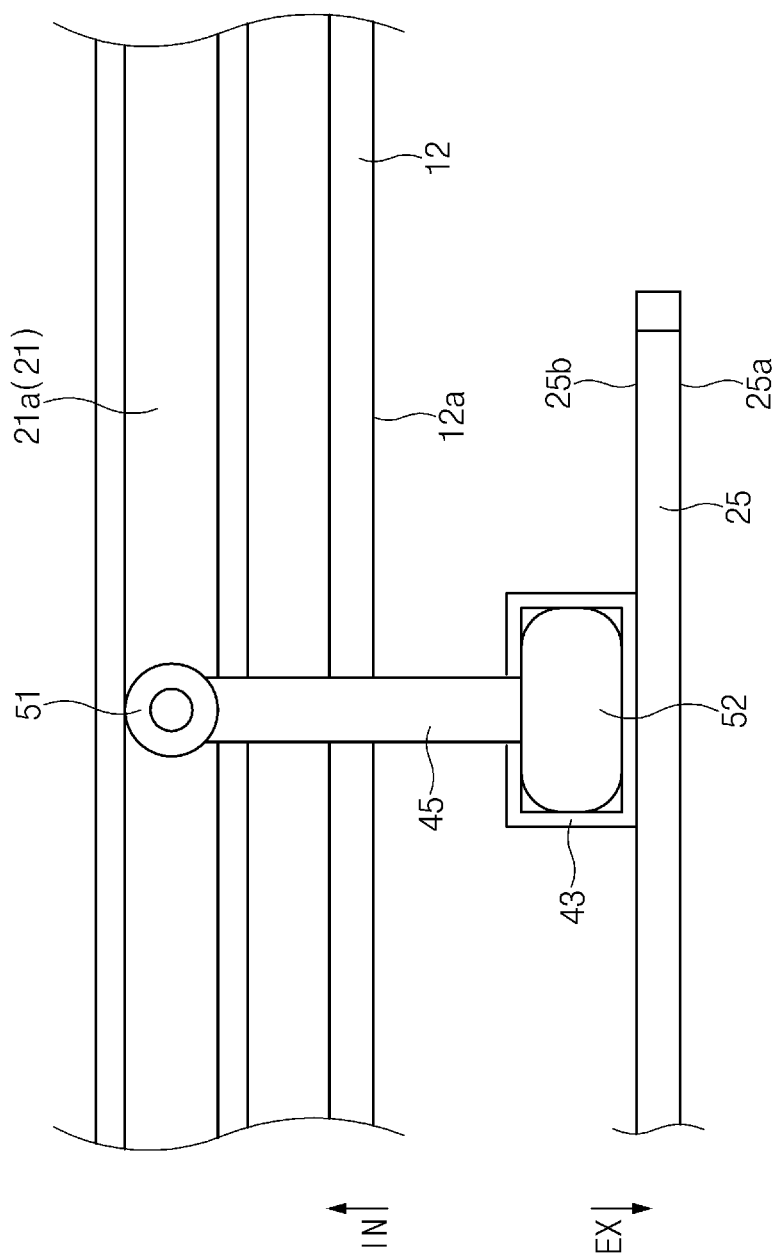
FIG. 12 illustrates a cross-sectional view taken along line H-H of FIG. 11.

When the door glass 25 is moved to the fully opened position to fully open the door opening 2 as illustrated in FIG. 11, the first roller 51 of the upper guide shaft 45 may be guided along the first upper rail section 21a of the upper guide rail 21 as illustrated in FIG. 12, and the door glass 25 may move along the external surface 12a of the fixed wall 12.

As set forth above, the door glass 25 may be guided along the upper guide rail 21, the vertical guide rail 43, and the lower guide rail 22, so that the drive mechanism for moving the door glass 25 may be relatively compact inside the door panel 11, compared to a corresponding one according to the related art. Since the thickness of the door panel 11 is made thin, the interior space of the vehicle may be increased, and sufficient spaces for displays, storage, and the like, may be secured in the inside of the door panel 11.

In addition, the second upper rail section 21b of the upper guide rail 21 and the second lower rail section 22b of the lower guide rail 22 may be offset from the fixed wall 12 toward the interior space of the vehicle 1 and protrude from the front edge of the fixed wall 12 toward the front of the vehicle, so that a simple, compact flush-glass arrangement may be effectively achieved. Thus, the exterior styling, aerodynamic performance, and noise vibration harshness (NVH) performance of the vehicle may be improved, and parts such as a door module, a door regulator, a center pillar, and a door frame may be eliminated, so that the manufacturing cost may be reduced.

Hereinabove, although embodiments of the present disclosure have been described with reference to the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A door glass assembly for a vehicle, the door glass assembly comprising:
   a door panel;
   a fixed wall which is fixedly connected to a top end of the door panel;
   an upper guide rail which extends along a top edge of the fixed wall;
   a lower guide rail which extends along a bottom edge of the fixed wall;
   a door glass which is movable in a horizontal direction with respect to the fixed wall, and is guided to move along the upper guide rail and the lower guide rail in the horizontal direction, wherein the door glass is configured to open and close a portion of a door opening defined by the door panel and the fixed wall;
   a vertical guide rail attached to an internal surface of the door glass; and
   an upper guide shaft connected between the upper guide rail and the vertical guide rail, wherein the upper guide shaft has a first roller which is guided along the upper guide rail and a second roller which is guided along the vertical guide rail.

2. The door glass assembly according to claim 1, wherein an external surface of the door glass is flush with an external surface of the fixed wall when the door glass is in a closed position to close the door opening.

3. The door glass assembly according to claim 1, wherein the upper guide rail includes a first upper rail section which is spaced apart from the fixed wall toward an interior space of the vehicle, a second upper rail section which is offset from the first upper rail section toward the interior space of the vehicle, and a third upper rail section connecting the first upper rail section and the second upper rail section, and
   wherein the lower guide rail includes a first lower rail section which is spaced apart from the fixed wall toward the interior space of the vehicle, a second lower rail section which is offset from the first lower rail section toward the interior space of the vehicle, and a third lower rail section connecting the first lower rail section and the second lower rail section.

4. The door glass assembly according to claim 3, wherein the third upper rail section extends from the first upper rail section in an oblique direction, and wherein the second upper rail section extends from the third upper rail section.

5. The door glass assembly according to claim 4, wherein the third upper rail section and the second upper rail section protrude from the fixed wall.

6. The door glass assembly according to claim 3, wherein the third lower rail section extends from the first lower rail section in an oblique direction, and wherein the second lower rail section extends from the third lower rail section.

7. The door glass assembly according to claim 6, wherein the third lower rail section and the second lower rail section protrude from the fixed wall.

8. The door glass assembly according to claim 1, further comprising a lower guide shaft connected between the lower guide rail and an internal surface of a bottom end of the door glass, wherein the lower guide shaft has a third roller which is guided along the lower guide rail.

9. The door glass assembly according to claim 1, further comprising:
   an upper support provided on a top end of the fixed wall and supporting the upper guide rail; and
   a lower support provided on a bottom end of the fixed wall and supporting the lower guide rail.

10. The door glass assembly according to claim 9, wherein the upper guide rail includes a first upper rail section which is spaced apart from the fixed wall toward an interior space of the vehicle, a second upper rail section which is offset from the first upper rail section toward the interior space of the vehicle, and a third upper rail section connecting the first upper rail section and the second upper rail section and wherein the upper support includes a first upper support section supporting the first upper rail section, a second upper support section supporting the second upper rail section, and a third upper support section supporting the third upper rail section.

11. The door glass assembly according to claim 10, further comprising:
   an upper flat section connected to a top end of the upper support; and
   at least one weatherstrip disposed between the upper flat section and a top edge of the door glass, wherein the weatherstrip seals the top edge of the door glass.

12. The door glass assembly according to claim 9, wherein the lower guide rail includes a first lower rail section which is spaced apart from the fixed wall toward an interior space of the vehicle, a second lower rail section which is offset from the first lower rail section toward the interior space of the vehicle, and a third lower rail section connecting the first lower rail section and the second lower rail section, and wherein the lower support includes a first lower support section supporting the first lower rail section, a second lower support section supporting the second lower rail section, and a third lower support section supporting the third lower rail section.

13. The door glass assembly according to claim 12, further comprising:
   a lower flat section connected to a bottom end of the lower support; and
   at least one weatherstrip disposed between the lower flat section and a bottom edge of the door glass, wherein the weatherstrip seals the bottom edge of the door glass.

14. The door glass assembly according to claim 9, wherein an interior trim is fixedly connected to an internal surface of the fixed wall, and wherein the interior trim has at least one weatherstrip sealing an edge of the door glass.

15. A door glass assembly for a vehicle, the door glass assembly comprising:
   a door panel;

a fixed wall which is fixedly connected to a top end of the door panel;

an upper guide rail which extends along a top edge of the fixed wall, wherein the upper guide rail includes a first upper rail section which is spaced apart from the fixed wall toward an interior space of the vehicle, a second upper rail section which is offset from the first upper rail section toward the interior space of the vehicle, and a third upper rail section connecting the first upper rail section and the second upper rail section;

a lower guide rail which extends along a bottom edge of the fixed wall;

a door glass which is movable in a horizontal direction with respect to the fixed wall, and is guided to move along the upper guide rail and the lower guide rail in the horizontal direction, wherein the door glass is configured to open and close a portion of a door opening defined by the door panel and the fixed wall;

an upper support provided on a top end of the fixed wall, and supporting the upper guide rail, wherein the upper support includes a first upper support section supporting the first upper rail section, a second upper support section supporting the second upper rail section, and a third upper support section supporting the third upper rail section; and a lower support provided on a bottom end of the fixed wall, and supporting the lower guide rail.

16. The door glass assembly according to claim 15, further comprising:

an upper flat section connected to a top end of the upper support; and at least one weatherstrip disposed between the upper flat section and a top edge of the door glass, wherein the weatherstrip seals the top edge of the door glass.

17. The door glass assembly according to claim 15, wherein an external surface of the door glass is flush with an external surface of the fixed wall when the door glass is in a closed position to close the door opening.

18. A door glass assembly for a vehicle, the door glass assembly comprising:

a door panel;

a fixed wall which is fixedly connected to a top end of the door panel;

an upper guide rail which extends along a top edge of the fixed wall;

a lower guide rail which extends along a bottom edge of the fixed wall wherein the lower guide rail includes a first lower rail section which is spaced apart from the fixed wall toward an interior space of the vehicle, a second lower rail section which is offset from the first lower rail section toward the interior space of the vehicle, and a third lower rail section connecting the first lower rail section and the second lower rail section;

a door glass which is movable in a horizontal direction with respect to the fixed wall, and is guided to move along the upper guide rail and the lower guide rail in the horizontal direction, wherein the door glass is configured to open and close a portion of a door opening defined by the door panel and the fixed wall;

an upper support provided on a top end of the fixed wall, and supporting the upper guide rail; and a lower support provided on a bottom end of the fixed wall, and supporting the lower guide rail, wherein the lower support includes a first lower support section supporting the first lower rail section, a second lower support section supporting the second lower rail section, and a third lower support section supporting the third lower rail section.

19. The door glass assembly according to claim 18, further comprising:

a lower flat section connected to a bottom end of the lower support; and at least one weatherstrip disposed between the lower flat section and a bottom edge of the door glass, wherein the weatherstrip seals the bottom edge of the door glass.

* * * * *